US008678246B2

(12) United States Patent
Reuter

(10) Patent No.: US 8,678,246 B2
(45) Date of Patent: Mar. 25, 2014

(54) CARTRIDGE AND PISTON WITH VENTILATION DEVICE

(75) Inventor: Martin Reuter, Rotkehlchenweg (DE)

(73) Assignee: adcatec GmbH (DE)

( * ) Notice: Subject to any disclaimer, the term of this patent is extended or adjusted under 35 U.S.C. 154(b) by 256 days.

(21) Appl. No.: 12/934,825

(22) PCT Filed: Mar. 26, 2009

(86) PCT No.: PCT/EP2009/053627
§ 371 (c)(1),
(2), (4) Date: Dec. 27, 2010

(87) PCT Pub. No.: WO2009/118395
PCT Pub. Date: Oct. 1, 2009

(65) Prior Publication Data

US 2011/0089200 A1 Apr. 21, 2011

(30) Foreign Application Priority Data

Mar. 26, 2008 (DE) ........................ 10 2008 000 841

(51) Int. Cl.

| | |
|---|---|
| ***B67D 7/60*** | (2010.01) |
| ***G01F 11/00*** | (2006.01) |
| ***B65D 88/54*** | (2006.01) |
| ***B65D 6/40*** | (2006.01) |
| ***B65D 90/22*** | (2006.01) |
| ***F16J 1/06*** | (2006.01) |
| ***F16J 1/04*** | (2006.01) |

(52) U.S. Cl.
USPC ........... 222/387; 222/326; 222/327; 222/386; 220/745; 92/201; 92/203; 92/207; 92/209

(58) Field of Classification Search
USPC .......... 222/386, 387, 326, 327, 137; 220/745, 220/747
See application file for complete search history.

(56) References Cited

U.S. PATENT DOCUMENTS

| | | | | |
|---|---|---|---|---|
| 2,992,052 A * | 7/1961 | De John | .......................... | 92/246 |
| 3,901,416 A * | 8/1975 | Schultz | ......................... | 222/389 |
| 4,951,848 A | 8/1990 | Keller | | |
| 5,178,305 A | 1/1993 | Keller | | |
| 5,316,186 A * | 5/1994 | Prestele | ........................ | 222/327 |

(Continued)

FOREIGN PATENT DOCUMENTS

| | | |
|---|---|---|
| DE | 29506800 | 10/1996 |
| EP | 0463991 | 6/1991 |
| EP | 0497739 | 1/1992 |

(Continued)

*Primary Examiner* — Paul R Durand
*Assistant Examiner* — Matthew Lembo
(74) *Attorney, Agent, or Firm* — Price Heneveld LLP

(57) ABSTRACT

The present invention relates to a cartridge for holding liquid, paste-like or powdered compounds and a piston for closing such a cartridge, and a system made up of such a cartridge, comprising a tool (15), wherein the piston comprises a cylindrical or cylindrical tube-like base member that can be placed into a cartridge and moved along the cylindrical longitudinal axis inside a cartridge, wherein at least one sealing lip (12) is provided that seals against a sealing surface running parallel to or at an acute angle with respect to the cylindrical longitudinal axis, wherein the sealing lip is arranged such that by way of a tool that can be accessed from an end side of the piston, the sealing lip can be lifted off the sealing surface when the cartridge is closed by the piston so that air can escape from the cartridge.

11 Claims, 3 Drawing Sheets

(56) References Cited

U.S. PATENT DOCUMENTS

| | | | | |
|---|---|---|---|---|
| 5,400,926 | A | 3/1995 | Keller | |
| 6,158,621 | A * | 12/2000 | Keller | 222/95 |
| 6,494,348 | B2 * | 12/2002 | Prestele | 222/326 |
| 6,598,766 | B1 * | 7/2003 | Brugner | 222/326 |
| 6,899,254 | B1 | 5/2005 | Sandholm et al. | |
| 2005/0029306 | A1 * | 2/2005 | Brennan | 222/327 |
| 2005/0066809 | A1 * | 3/2005 | Nehren et al. | 91/422 |
| 2007/0000950 | A1 * | 1/2007 | Ingram et al. | 222/320 |

FOREIGN PATENT DOCUMENTS

| | | |
|---|---|---|
| EP | 1514812 | 3/2005 |
| EP | 1738834 | 1/2007 |
| WO | WO 9947433 | 9/1999 |
| WO | WO 0155006 | 8/2001 |
| WO | WO 0194028 | 12/2001 |

* cited by examiner

FIG. 1
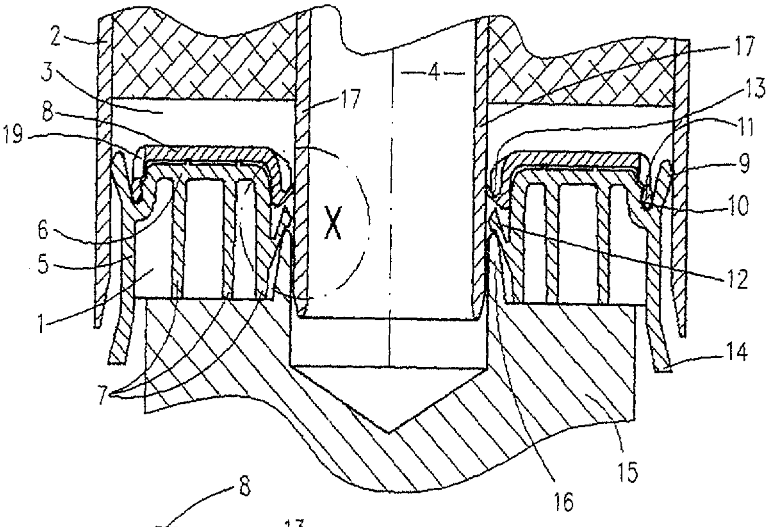
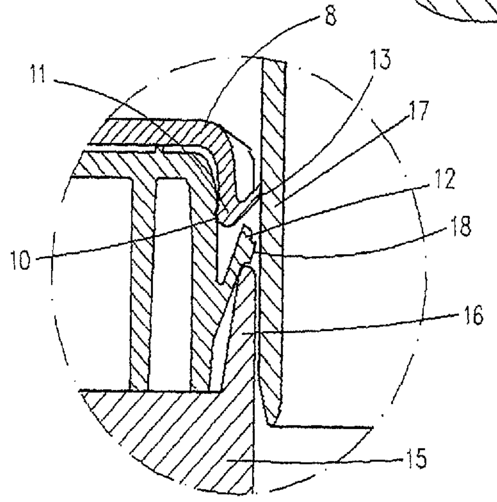
FIG. 2
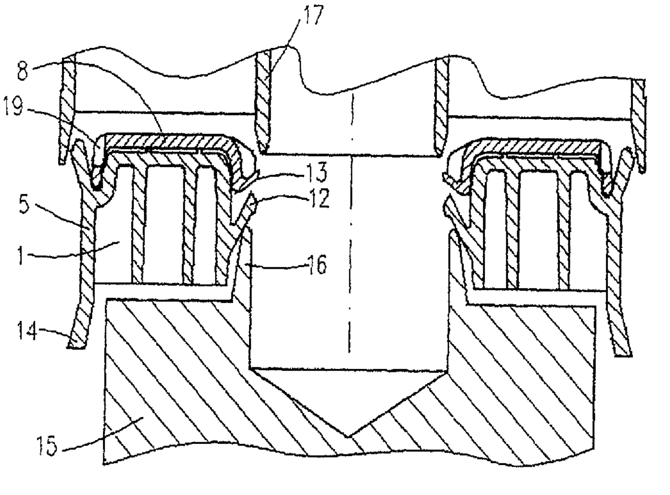
FIG. 3

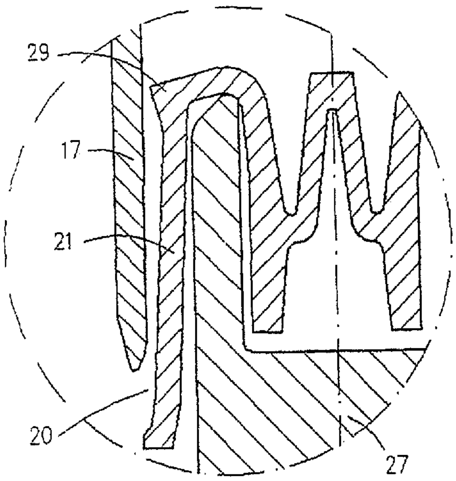
FIG. 5
FIG. 4
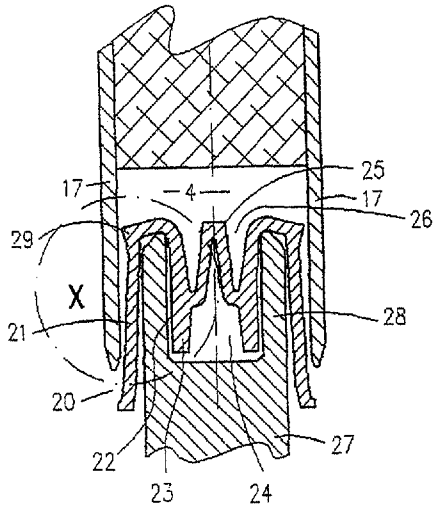
FIG. 6
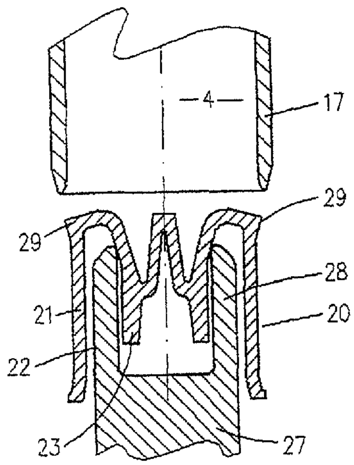

CARTRIDGE AND PISTON WITH VENTILATION DEVICE

BACKGROUND OF THE INVENTION

1. Field of the Invention

The present invention relates to a piston for a cartridge having a cylinder-like or cylindrical tube-like base member which can be inserted into a cartridge and is displaceable along the cylindrical longitudinal axis in a cartridge and a corresponding cartridge for holding and storing liquid, powder or paste-like compounds and a system comprising a corresponding cartridge and a tool for displacing the piston in the cartridge.

2. Prior Art

Cartridges for holding liquid, paste-like or powder compounds have long been known for all kinds of engineering applications. A distinction is made between cartridges, which have only a single chamber for a corresponding compound or several chambers for storing different components separately and mixing them during processing. Examples of this are two-component adhesives, in which the components are stored separately and are mixed together during application in order that corresponding curing processes may be initiated.

Such cartridges have different designs, such as so-called side-by-side forms in which the chambers are beside each other, and coaxial cartridges in which the chambers are arranged coaxially inside each other.

These various cartridges, which can be used for all kinds of purposes, share the fact that usually one or more pistons are provided, which are accordingly displaceably accommodated in the chambers, such that the compounds held in the chambers can be discharged through a dispensing opening by means of the pistons. Apart from filling of the chambers via the dispensing openings, filling is usually effected via the piston-side open end of the corresponding chamber. Accordingly, when a cartridge is filled, the compound is introduced into it at the piston-side open end of the chamber, whereafter the open end is then sealed with the piston. The piston must be held tightly against the walls of the chamber to prevent the liquid, paste-like or powder-like compound from leaving the chamber. The problem with this, however, is that, during filling and initial insertion of the piston, care must be taken to allow air in the chamber to escape as the piston is being brought into contact with the compound held in the chamber.

To this end, various solutions are known such as are described in the prior art, e.g. in German Utility Model DE 295 06 800, European Patent Application EP 1 738 834 A1, European Patent Application EP 1 514 812 A1, European Patent EP 0 497 739 B1, European Patent Application EP 344 491 A1, European Patent Application EP 463 991 A1, U.S. Pat. No. 6,899,254 B1, PCT application WO 03/050012 A1, PCT application WO 01/94028.

In these publications, various pistons with ventilation devices are disclosed which describe inter alia pistons, that can have different valves which are usually in the central area of the piston and which are open during the closing process in order to allow air to escape and which, after the chamber opening has been closed with the piston, can themselves be closed to prevent the compound held in the chamber from escaping.

The disadvantage of this prior-art solution, however, is that the pistons become very complex owing to the configuration of the valves and thus are very complicated to produce. Moreover, such valves are prone to malfunction and leaks can occur when they are actuated again. In addition, the closing process itself can be complicated if, apart from setting of the piston, a second operation to close the valve or valves becomes necessary. An additional disadvantage is that, when the chamber is closed by means of the piston, the compound held therein can assume a conical shape which has the effect that, in the central area, where the valves are usually arranged, the compound held in the chamber impinges first on the piston and thus complete venting is no longer possible.

Moreover, the above-mentioned prior art discloses cover plates which prevent the actual piston member from making direct contact with potentially chemically reactive compounds. In accordance with the above-cited prior art, such cover plates can be integrated into appropriate ventilation devices.

DISCLOSURE OF THE INVENTION

Object of the Invention

It is therefore an object of the present invention to provide a cartridge or a piston suitable for closing a cartridge and a corresponding tool for ensuring that the cartridge is vented safely, rapidly and effectively when closed with the piston. In addition, the piston is to be of simple design and easy to manufacture. Furthermore, the cartridge or the piston is to effect a reliable seal over a long period in storage. The closing operation, too, is to be done effectively and simply.

Technical Solution

The present invention provides a piston which has a cylindrical or cylindrical tube-like base member. The piston comprises at least one sealing lip which seals against a sealing surface running parallel with or at least at an acute angle to the cylindrical longitudinal axis of the piston or the cartridge. The sealing lip is arranged such that, when the cartridge is closed by the piston, the sealing lip can be raised from the sealing surface by means of a tool which can be accessed from an end face of the piston, such that air can escape from the cartridge through the resulting gap. The sealing lip, which is actuated by means of a tool which is accessed from the end face, serves as a simple yet very effective venting possibility.

The sealing lip can thereby be arranged such that, on being lifted up from the sealing surface, it executes at least in part a movement transverse to the cylindrical longitudinal axis. Contrary to the valves known from the prior art, which usually execute a movement in parallel with the cylindrical longitudinal axis of the cartridge, this permits simple and reliable closing after closing of the cartridge and simple actuation for the purpose of venting. The storage stability of the system, too, is improved, since it avoids the known long-term storage problem of leakage through valves pins of the valve systems.

The sealing lip can thereby run especially at an acute angle to the cylindrical longitudinal axis or be arranged accordingly at a part of the piston provided in parallel therewith. In this manner, as it lifts, the sealing lip can execute a pivoting movement which reduces the acute angle accordingly. The pivoting movement can be achieved by elastic deformation. After the tool has been removed, the sealing lip can make contact again with the corresponding sealing surface under an elastic restoring force and, by virtue of the elastic restoring force, can provide sufficient contact pressure.

Accordingly, the tool can directly act on the sealing lip, or alternatively effect a different type of elastic deformation of the piston or any part thereof, causing the sealing lip to move correspondingly from a sealing state to a non-sealing state and vice versa.

For example, this can be effected by arranging a pocket beside the sealing lip into which pocket the tool can engage, with the pocket being arranged such that engagement of the tool causes deformation of the pocket, which causes lifting of the sealing lip. This can be accomplished, for example, by the pocket's having a corresponding shape, for example a bevel, which causes compression of the piston. Other interactions of the tool with the piston are conceivable which go beyond elastic deformation and the associated movement of the sealing lip.

In particular, the piston can also be configured such that, as the chamber is closed, the resultant air cushion and associated air pressure lead to deformation of the piston, which favours the formation of a gap for the escape of air, whereas, during contact with the compound to be held in the chamber, the sealing effect is enhanced. This can be achieved, for example, by giving the sealing lip a corresponding shape, for which, through the air flow during closing and the corresponding air cushion in front of the piston a non-sealing position is favoured, whereas, during static storage of compound held in the chamber, the sealing position of the sealing lip is favoured.

The sealing lip may be arranged on the cylinder outer side or, in the case of a cylindrical tube-like base member, i.e. a base member with an annular structure, on the tube inner side or the annulus inner side, such that the sealing lip cooperates with a wall of the corresponding chamber to act as a sealing surface. This allows the entire design of the cartridge and the piston to be kept simple.

In particular, in the case of a circular cylinder structure or an annulus cylinder, the corresponding sealing lip can be provided circumferentially. However, this applies to other cylindrical structures having square, rectangular or other polygonal shapes.

The piston can also have a cover plate which is arranged at that end face of the base member which is provided in the direction of the chamber in the cartridge, i.e. in the direction of the cartridge interior. Such a cover plate can serve to cover the base member of the piston from the compound which is stored in the chamber and which can be chemically very reactive. Accordingly, the cover plate can be formed from a compound different from the base member of the piston in order that it may possess a corresponding resistance to the chemically active compound in the chamber. This makes it possible to select the materials separately so as to match the required property profiles for the base member and the cover plate. For example, the base member of the piston can be formed from a softer, more elastic material while the cover plate can be formed from a hard material. Preferably, the cover plate can be formed from polyamide.

The provision of the cover plate can also be used to form a ventilation device in which the sealing lip is a part of the ventilation device. The cover plate can also be formed such that the sealing lip is protected from contact with the compound held in the chamber, such that compound is unable to escape through any gap created when the lip is open. To this end, the covering element can have a sealing element adjacent to the sealing lip.

The cover plate can further provide a sealing surface which the sealing lip seals against when, for example, sealing against a wall of the chamber is not possible or is undesirable.

The cover plate usually has a structure resembling the piston base member in the form of a cylindrical or cylindrical tube-like basic shape, wherein a U-shaped or U-shaped annular structure can be formed in the longitudinal cross-section in which structure a shank provided circumferentially in the direction of the cylindrical longitudinal axis can engage with a corresponding recess of the base member and can thereby be connected to the base member.

The connection can be effected here in that the shank of the cover plate has locking elements which correspond with locking elements of the base member. The shank of the cover plate can encompass the base member on at least one side, so that the shank comes to rest on the inner side of the chamber. Preferably, however, the shank engages with a recess in the base member, such that it is spaced apart from the inner side of the chamber. Especially, different variants can be realized on the outer and the inner side. Instead of a circumferential shank on the cover plate with a corresponding recess in the piston base member, the opposite construction can also be chosen, or several connecting parts for locking and plug devices or other types of connections between the base member and cover plate can be provided.

To safeguard venting during sealing of the chamber with the piston, a cover plate, which largely covers the entire cross-section of the chamber of the cartridge, can have at least one air passage opening.

Preferably, a plurality of air passage openings can also be provided.

The air passage openings in particular can be provided at a distance from the sealing lip of the base member, so that the air must pass at least along a stretch through at least one air duct between the air passage opening of the cover plate and the sealing lip of the base member during venting. Accordingly, between the base of the piston and the cover plate can be provided at least one, preferably several air ducts in which the air is guided during venting. Such a measure has the advantage of allowing the air passage opening and/or air duct to be formed such that, although air or other gaseous substances can pass through, liquid, paste-like or powdery substances, such as the compound held in the chamber, cannot. The outcome is a so-called filter section, which prevents the compound held in the chamber from escaping upon contact with the piston.

In the closed state, the sealing lip then additionally provides protection against the unwanted escape of the compound held in the chamber.

The air passage opening can preferably be provided on the outer side of the cylinder-like or cylindrical tube-like basic shape or the tube inner side or in the centre of the cover plate, wherein the sealing lip can accordingly be provided as far away as possible from the air passage opening at the tube inner side or in the area of the centre of the cover plate or at the outer side of the cylinder or cylinder tube-like basic shape of the piston. This ensures that the air duct has a certain minimum length, which serves to retain the compound held in the chamber. For example, the air passage opening can be provided at the outer side of the cylinder-like or cylindrical tube-like basic shape of the cover plate, while the sealing lip for creating a vent opening can then be provided, in the case of a cylindrical tube-like basic shape, at the tube inner side or, in the case of a simple cylindrical basic shape, in the centre of the cover plate at the piston.

If the sealing lip of the piston base member is provided in the central area of the base member, the cover plate can provide a corresponding sealing surface in the form of a sleeve or a tubular support protruding in the direction of the base member. The preferential provision of an air passage opening in the outer region of the cover plate ensures that, when the compound assumes a conical shape during the closing process, the air present in the outer region or edge region area of the chamber can be completely removed. Accordingly, from a further aspect of the present invention, for which protection is sought independently and in combination with other aspects of the invention, it is essential that at least one venting device be provided at the outer side of a cylinder-like or cylindrical tube-like piston or at the inner side of a cylindrical tube-like piston. This enables the cartridge to be fully vented, even when the compound held therein assumes a conical shape. The corresponding ventilation devices can be formed by a sealing lip at the piston base member or by at least one air passage opening at a cover plate of the piston.

A ventilation device can be formed by at least two venting devices and an air duct provided between them.

In order that a corresponding cartridge may be closed with a piston, in which piston the ventilation device can be actuated contemporaneously with the closing process, a tool is provided which actuates the sealing lip upon displacement of the piston in the cartridge. Such a tool can be formed as a rod whose one end face has a tubular extension for cooperating with a sealing lip or a receiving pocket.

Tubular extension in this connection means that it can be a circular cylindrical tube-like extension or a cylindrical tube-like extension with a corresponding square, rectangular or other polygonal basic shape, corresponding to the design of the sealing lip and the corresponding piston. The tubular extension can be formed as an outer tubular extension, in which, corresponding to the diameter of the rod, a continuation in the form of a tube occurs, for example, for the purpose of actuating a sealing lip provided on the outer circumference of a cylinder-like piston. If the sealing lip is arranged in an inner region, the tubular extension can also have a smaller diameter than the remaining rod cross-section.

In particular, the tool can also comprise a venting duct that cooperates with the tubular extension to form a continuous venting duct.

BRIEF DESCRIPTION OF THE FIGURES

Further advantages, characteristics and features of the present invention are apparent from the following detailed description of embodiments with reference to the accompanying drawings. The drawings show in purely schematic form in FIG. 1 a longitudinal cross-section through a part of the inventive cartridge with a sealing piston and an insertion tool FIG. 2 a detailed view of the cross-section from FIG. 1;

FIG. 3 a cross-section as per FIG. 1 in the state prior to insertion of the piston;

FIG. 4 a longitudinal cross-section through the inner chamber of a coaxial cartridge with a corresponding sealing piston and an insertion tool.

FIG. 5 a detailed view of the cross-section from FIG. 4;

FIG. 6 a cross-section as per FIG. 4 in the state prior to insertion of the piston;

FIGS. 1 to 3 show longitudinal cross-sections of a first embodiment of the invention. Longitudinal cross-section in this context means that the cross-section is parallel with the cylindrical longitudinal axis of the cartridge. Accordingly, the cylindrical longitudinal axis in FIG. 1 is shown as a dot-dash line in the centre of the figure.

FIGS. 1 to 3 show a co-axial cartridge with a cylindrical tube-like or annular chamber 3 and an inner cylinder-like chamber 4. Accordingly, two different substances can be stored separately in the chambers 3 and 4. The chambers 3 and 4 are limited by a cylindrical tube-like outer wall 2 and a cylindrical tube-like inner wall 17 which is accommodated coaxially in the cylindrical tube-like outer wall 2.

Figure 7:
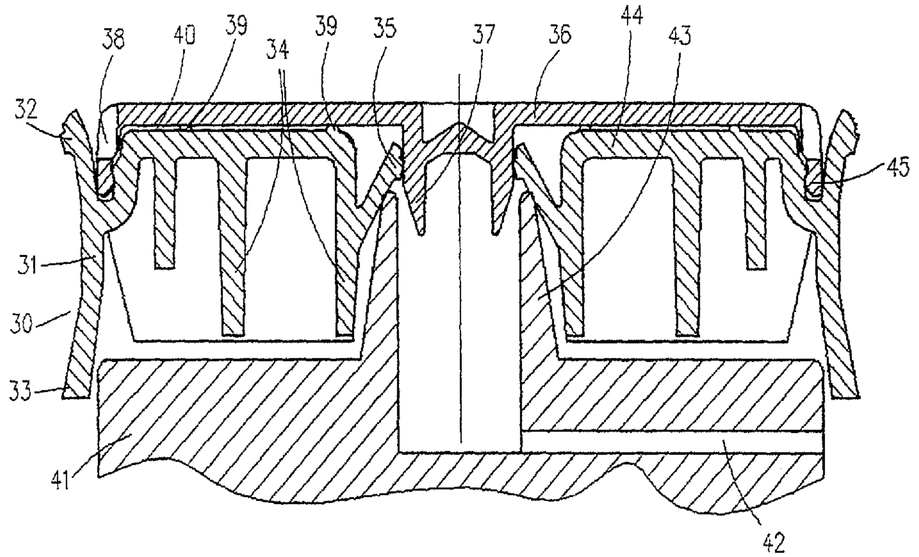
FIG. 7 a longitudinal cross-section through a further embodiment of an inventive piston with an insertion tool, and in FIG. 8 a longitudinal cross-section as per FIG. 7 in which the tool has opened the ventilation device.

To seal the annular chamber 3, an annular or cylindrical tube-like piston 1 is provided which can be inserted by means of a tool 15 into the chamber 3 in order that the chamber 3 may be sealed off against liquid, paste-like or powder-like compound held there.

The piston 1 has a cylindrical base member with a cylindrical outer wall 5 which is connected to an annular disc 6. At the annular disc 6 are provided tubular reinforcement supports 7.

At the inner side of the cartridge, that is at the end face of the piston 1 facing the chamber 3, i.e. at the annular disc 6, is provided a cover plate 8, also having an annular structure. The cover plate 8 is formed from material which is different from base member 1 in order that it may exhibit specific properties regarding the resistance to reactive compounds in the chamber 3.

The cover plate 8 also has a cylindrical tube-like or cylinder-like basic structure, with a U-ring shape in its longitudinal cross-section. Near that section of the cover plate 8 which is arranged transversely to the cylindrical longitudinal axis of the cartridge and makes surface contact with the compound arranged in the chamber 3, the cover plate 8 has shanks 11 on its outer side and inner side circumferential, said shanks projecting almost perpendicularly from the transverse section towards the base member 1 and thus towards the outer side of the cartridge. The shanks 11 engage with recesses 10 in the region at the outer side and the inner side of the base member 1 of the piston 1.

In the region of the shank 11 on the outer side of the cover plate is provided an air passage opening 19 while, on the inner side of the cover plate 8 which rests against the cylindrical tubular wall 17 is formed a sealing element 13 for making tight contact with the cylindrical tubular wall 17.

At one of the reinforcement supports 7 of the base member 1 below the sealing element 13 of the cover plate 8 is arranged a sealing lip 12 which also seals against the sealing surface, which is provided by the outer side of the cylindrical tubular wall 17. The sealing lip 12 is configured as a tapered truncated cone section which projects at an angle from the reinforcement support 7, which makes an acute angle with the reinforcement support 7 at which it is arranged and which runs parallel with the cartridge longitudinal axis or cylindrical longitudinal axis.

As shown in FIG. 1, the sealing lip 12 is arranged on the base member 1, such that, from the end face pointing away from the cartridge inner side, that is the chamber 3, a tool 15 with a cylindrical tube-like extension 16 can make contact with the sealing lip 12 and thus can raise this from the sealing surface of the cylindrical tubular wall 17.

Thus, if the piston with the base member 1 and the cover 8 is pushed by means of the tool 15 into the chamber 3, the air contained in the chamber 3 can pass through the air passage opening 19 through the cover plate 8 and through an air duct provided between the cover plate 8 and the annular disc 6 of the base member 1 into the region of the sealing lip 12 and can escape between the outer wall of the cylindrical tubular wall 17 and the tubular extension 16. The air passage opening 19 and the air duct between the cover plate 8 and the annular disc 6 is formed in this regard such that, although air can pass through, the compound held in the chamber 3 cannot pass through the air passage opening 19 and through the air duct. In this way, the cartridge or the chamber 3, after filling with the compound to be held, can be sealed in a simple way with the piston 1, 8, whereby the air between the piston and the compound held in the chamber 3 can escape simply via the ventilation device, which is formed by the air passage opening 19, the air duct between cover plate 8 and annular disc 6, and the sealing lip 12, whereas the compound is safely held. After closing with the piston 1, 8, the tool 15 namely is removed so that the sealing lip 12 returns to making sealing contact at the outer surface or sealing surface of the cylindrical tubular wall 17 and, therefore, unfolds a sealing effect. Even if slight quantities of the compound held in the chamber 3 could escape through the air passage opening 19 and the transport duct, the sealing lip 12 effects a reliable seal, because the sealing lip 12 by virtue of its acute-angled arrangement is arranged such that any escaping compound would further increase the contact pressure of the sealing lip 12.

FIG. 2 shows in more detail the design of the sealing lip 12 with the sealing surface 18, which rests against the outer surface or sealing surface of the cylindrical tubular wall 17.

To prevent the compound held in the chamber 3 from exiting the chamber during venting through the gap formed when the sealing lip 12 is raised from the sealing position by the tool 15 or the tubular extension 16, the cover plate 8 has a sealing element 13 which also rests against the sealing surface of the cylindrical tubular wall 17 and prevents through-passage of the compound held in the chamber 3.

FIG. 3 shows the state of the components described above before insertion of the piston 1, 8 into the chamber 3 of the cartridge, whereby it becomes evident that sealing elements 9 and 14 are also provided at the cylindrical tubular wall 5 of the base member 1 of the piston, said sealing elements sealing against the inner side and the sealing surface of the outer cylinder wall 2 of the cartridge provided there. To facilitate sufficient contact pressure on the part of the sealing elements 9 and 14, these are designed to protrude slightly out from the cylindrical tubular wall 5 so as to generate elastic tension when the piston is inserted into the cartridge.

FIGS. 4 to 6 show the piston 20, which seals the chamber 4, i.e. the inner chamber of the co-axial cartridge. However, such a design would be possible for adjacent chambers, as in side-by-side cartridges.

Since it is common for co-axial cartridges to have the one chamber containing a reactive substance and the other chamber containing a non-reactive substance, the piston 20 is designed without cover plate, as the internal chamber is usually provided for the non-reactive substance. However, for a reactive substance, a piston with cover plate can also be provided, as described below, for example, in FIGS. 7 and 9.

FIGS. 4 to 6 show the longitudinal cross-sections along the cylindrical longitudinal axis of a piston 20, which again appears as a dot-dash line. The piston 20 has a cylindrical tubular wall 21 which is connected by a bend to an inner cylindrical tubular wall 23, such that between the cylindrical tubular walls 21 and 23, is formed an outwardly open annular pocket 22 into which a tubular extension 28 of a tool 27 can engage.

The cylindrical tube formed by the inner cylindrical tubular wall 23 is closed against the inner side of the chamber 4 by a cone arrangement 25, whereby a conical annular recess 26 is formed for receiving the compound cone generated during sealing. Overall, this creates an M-structure in the longitudinal cross-section of the piston.

In the region of the end face facing the chamber 4 of the cylindrical tube outer wall 21 is provided a circumferential sealing lip 29 which cooperates with the inner side or the inner sealing surface of the cylindrical tubular wall 17 to tightly seal the chamber 4.

The annular pocket 22 of the piston 20 is formed such that, upon engagement of tubular extension 28, piston 20 and the annular pocket 22 and thus the sealing element 29 are deformed such that the sealing element 29 is raised from the inner sealing surface of the cylindrical tubular wall 17. As a result, air which is present in the gap between the compound provided in the chamber 4 and the piston 20 can escape through the gap between the inner side of the cylindrical tubular wall 17 and the sealing element 29. This is clearly seen in FIG. 5, which is a detailed view of FIG. 4. Since the compound held in the chamber 4 is not a chemically aggressive component, it is not critical if, as the chamber 4 is being closed, a small amount of liquid, paste-like or powder-like compound, which is provided in the chamber 4, escapes via the ventilation device, which is provided by the sealing lip 29. After closing, when the tool 27 has been removed from the annular pocket 22, the sealing lip 29 lies however with sufficient contact pressure against the inner side of the cylindrical tubular wall 17, ensuring that the chamber 4 is reliably sealed. It is aided by the cone structure 25 which is connected with the inner cylindrical tubular wall 23 of piston 20, as this exerts an elastic restoring force transverse to the cylindrical longitudinal axis. As long as the tool 27 with the tubular extension 28 is located in the annular pocket 22, the tool 27 however absorbs the elastic restoring force of the conical structure 25 and the inner cylindrical tubular wall 23, which are located in the cylindrical chamber 24 of the tool. Instead of a tubular extension, a corresponding deformation can also be effected by sections of a tubular extension.

FIG. 6 shows that the piston 20 with the sealing lips 29 has a larger diameter than the inside diameter of the chamber 4, so long as the tool 27 is not fully accommodated in the annular pocket 22 and by the bevel, which, at the bend connecting the cylindrical tube outer wall 21 and the cylindrical tube inner wall 23 of the piston 20, reduces the diameter accordingly.

Figure 8:
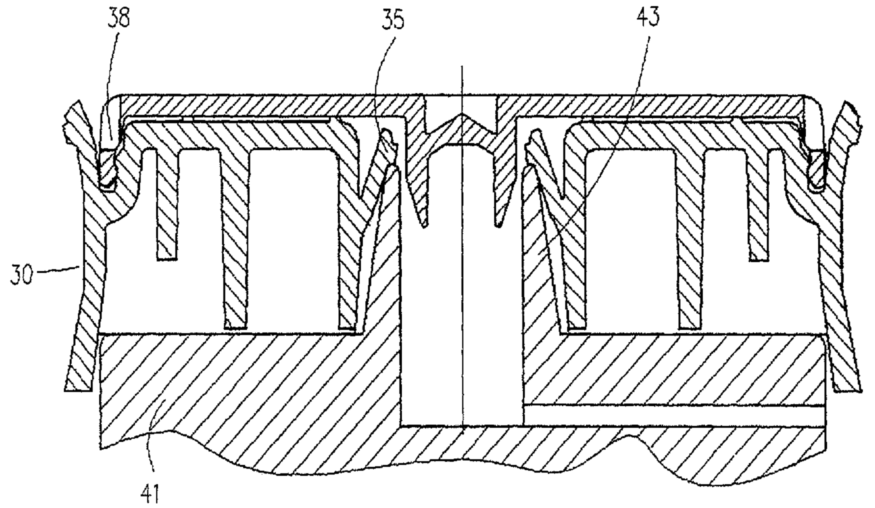

FIGS. 7 and 8 show a further embodiment of an inventive piston 30 which is very similar to the embodiment in FIGS. 1 to 3. However, there is no annular piston structure in this case, but rather a continuous disc-shaped structure, such as is shown, for example, in the embodiment of FIGS. 4 to 6. However, the embodiment of FIGS. 7 and 8 also has a cover plate 36, which can be made of a material other than that which is used to form the piston basic structure.

The piston basic structure again has a cylindrical tube-like wall 31, which comprises sealing elements 32 and 33 which seal against the inner side of a corresponding boundary wall of a chamber. The cylindrical tubular wall 31 is connected with an annular disc 44 running transverse to the cylindrical longitudinal axis, at which said disc are in turn arranged reinforcing tubular supports 34.

Similarly to the embodiment of FIGS. 1 to 3, the innermost reinforcing tubular support 34 has an acute-angled sealing lip 35, which seals not against a wall of a chamber a cartridge, but rather against one or more sealing surfaces, which are provided at a cylindrical tubular support 37, which extends from the cover plate 36 towards the base member of the piston 30.

The cover plate 36 has in its longitudinal cross-section a U-shaped basic structure, whereby again a cylindrical tube-like shank 45 is provided which runs parallel with the cylindrical longitudinal axis and is sealed by a disc arranged transversely to the cylindrical longitudinal axis. The cylindrical tube-like shank 45 engages, similarly to the embodiment of FIGS. 1 to 3, with corresponding recesses of the basic structure of the piston 30.

In the connecting area between the shank 45 with the transverse disc are provided air passage openings 38 in the form of a plurality of individual air passage openings or a circumferential passage opening. The air passage opening is connected to an air duct 40 which is formed between the cover plate 36 and the annular disc 44 of the base member of the piston 30. The air duct 40, for example, is formed in that spacers 39 are provided between the cover plate 36 and the annular disc 44. Consequently, air can flow through the air passage opening 38 across the air duct 40 to reach the sealing lip 35, which seals against the sealing surface of the tubular support 37 of the cover plate 36.

If the tool 41 with its tubular extension 43 engages from the end face of the piston 30 opposite the cartridge, the sealing lip 35 is raised from the sealing surface of the tubular support 37 of the cover plate 36 and air can escape via the ventilation device, which is formed by the air passage opening 38, the air duct 40 and the sealing lip 35. To ensure reliable escape of the air, a venting duct 42 which is connected to tubular extension 43 is provided in the tool 41. The state in which venting is possible is shown in FIG. 8, while FIG. 7 shows the sealing state.

Similar to the embodiment of FIGS. 1 to 3, the air passage opening(s) 38 and the air duct 40 can be formed such that air can indeed pass through, but the compound held in the corresponding chamber is largely retained. Even if compound should pass through the air passage opening and the air duct 40, in the sealed state, when the tool 41 has been removed, a sealing effect is created by the sealing lip 35, such that no compound can escape.

The invention is thus characterised by the following features:

1. Piston for a cartridge having a cylinder-like or cylindrical tube-like base member which can be inserted into a cartridge and is displaceable along the cylindrical longitudinal axis in a cartridge, wherein at least one sealing lip (12, 29, 35) is provided which seals against a sealing surface running parallel with or at least at an acute angle to the cylindrical longitudinal axis,
   wherein
   the sealing lip (12, 29, 35) is arranged such that, when the cartridge is closed by the piston, the sealing lip can be raised from the sealing surface by means of a tool (15, 27, 41) which can be accessed from an end face of the piston, such that air can escape from the cartridge.
2. Piston in accordance with characteristic 1,
   wherein
   the sealing lip (12, 29, 35) is arranged such that, on being lifted up from the sealing surface, it executes at least in part a movement transverse to the cylindrical longitudinal axis.
3. Piston in accordance with characteristic 1 or 2,
   wherein
   the sealing lip (12, 29, 35) is arranged at an acute angle to the cylindrical longitudinal axis and the acute angle is reduced during the lifting movement.
4. Piston in accordance with any of the preceding characteristics,
   wherein
   the sealing lip (12, 29, 35) is formed such that the tool can directly act on the sealing lip.
5. Piston in accordance with any of characteristics 1 or 2,
   wherein
   a pocket is formed beside the sealing lip (29) into which pocket the tool (27) can engage, with the pocket being arranged such that engagement of the tool causes deformation of the pocket, which causes lifting of the sealing lip.
6. Piston in accordance with any of the preceding characteristics,
   wherein
   the piston is formed such that the air pressure built up during closing leads to a deformation of the piston, such that the sealing lip is moved by the deformation towards a non-sealing position.
7. Piston in accordance with any of the preceding characteristics,
   wherein
   the sealing lip is formed such that, during closing, built-up air pressure in the chamber promotes a movement of the sealing lip into a non-sealing position, whereas during contact of the compound in the chamber the sealing effect is increased.
8. Piston in accordance with any of the preceding characteristics,
   wherein
   the sealing lip (29) is provided at the cylinder outer side.
9. Piston in accordance with any of the preceding characteristics,
   wherein
   the sealing lip (29) is provided circumferentially at the cylinder outer side.
10. Piston in accordance with any of the preceding characteristics,
    wherein
    the piston (20) has in the longitudinal cross-section an M-shaped basic structure with a central conical ring-like depression of the end face to be arranged in the cartridge.
11. Piston in accordance with any of the preceding characteristics,
    wherein
    the sealing lip (12) in the case of a cylindrical tube-like base member is arranged at the tube inner side.
12. Piston in accordance with any of the preceding characteristics,
    wherein
    the sealing lip (12) in the case of a cylindrical tube-like base member is arranged circumferentially at the tube inner side.
13. Piston in accordance with any of the preceding characteristics,
    wherein
    the piston at least one cover plate (8, 36) at the end face facing the cartridge interior.
14. Piston in accordance with characteristic 13,
    wherein
    the cover plate (8, 36) is formed from a material different to that for the base member.
15. Piston in accordance with characteristic 13 or 14,
    wherein
    the cover plate (8, 36) is made of polyamide.
16. Piston in accordance with any of the preceding characteristics,
    wherein
    a cover plate (8) is provided at the end face facing the cartridge interior, which has a sealing element (13) adjacent to the sealing lip to protect the sealing lip against the cartridge contents.
17. Piston in accordance with any of the preceding characteristics,
    wherein
    the sealing lip (35) lies against a sealing surface of a cover plate (36) provided at the end face facing the cartridge interior.

18. Piston in accordance with any of characteristics 13 to 17, wherein
the cover plate (8, 36) has in the longitudinal cross-section a cylinder-like or cylindrical tube-like basic shape with a U- or U-shaped annular structure, wherein the shanks pointing towards the cylindrical longitudinal axis engaging with recesses of the base member.
19. Piston in accordance with any of characteristics 13 to 18, wherein
the cover plate has at least one air passage opening (19, 38).
20. Piston in accordance with characteristic 19, wherein
the air passage opening (19, 38) is spaced apart from the sealing lip.
21. Piston in accordance with characteristic 19 or 20, wherein
between the sealing lip and the air passage opening is provided at least one air duct (40) between base member and cover plate.
22. Piston in accordance with any of characteristics 19 to 21, wherein
the air passage opening on the outer side of the cylinder-like or cylindrical tube-like basic shape or the tube inner side or in the centre of the cover plate, wherein the sealing lip is accordingly provided as far away as possible at the tube inner side or in the region of the centre of the cover plate or at the outer side of the cylinder-like or cylindrical tube-like basic shape.
23. Piston in accordance with any of characteristics 13 to 21, wherein
the cover plate (36) has, in a central region, a sleeve (37) with a sealing surface that projects towards the base member.
24. Piston in accordance with any of the preceding characteristics, wherein
the base member is made of polyethylene PE, low density polyethylene, LDPE, high density polyethylene HDPE or polypropylene PP.
25. Cartridge with a piston in accordance with any of the previous characteristics.
26. Cartridge with at least one cylinder-like or cylindrical tube-like chamber (3, 4) for liquid, powder or paste-like compounds and at least one piston (18, 20), which can be displaced along the cylindrical longitudinal axis and serves to close the cartridge, wherein
at least one ventilation device (12, 19) is arranged at the outer side of the cylinder-like or cylindrical tube-like piston or at the inner side of the cylindrical tube-like piston.
27. Piston in accordance with characteristic 25 or 26, wherein
the ventilation device is formed by a sealing lip (12) at a piston base member facing away from the cartridge inner side or by at least one air passage opening (19) at a cover plate of the piston pointing towards the cartridge inner side.
28. Cartridge in accordance with any of characteristics 25 to 27, wherein
at least two venting devices (12, 19) form a ventilation device which encompasses an air duct between the venting devices.
29. System comprising a cartridge in accordance with any of characteristics 25 to 28 and a tool for displacing a piston in the cartridge, wherein the tool actuates a sealing lip.
30. System in accordance with characteristic 29, wherein
the tool comprises a rod having at one end face an outer or inner tubular extension for cooperating with a sealing lip or a receiving pocket.
31. System in accordance with characteristic 29 or 30, wherein
the tool has a venting duct which cooperates with a tubular extension.

Although the present invention has been described in detail using the attached embodiments, it is obvious to a person skilled in the art that the invention is not restricted to these embodiments, but rather that modifications, are possible, especially in the form of different combinations of individual characteristics, as well as the omission of individual characteristics, without departing from the protective scope of the accompanying claims. Especially, the present invention claims all combinations of individual characteristics presented.

The invention claimed is:

1. A piston for insertion in a co-axial cartridge having a tube-like outer wall and a tube-like inner wall defining an annular chamber therebetween, wherein the piston comprises:
a cylindrical annular base member which can be inserted into the annular chamber of the cartridge and is displaceable along a cylindrical longitudinal axis in the cartridge, wherein the base member comprises a body and at least one sealing lip protruding from said body so as to extend radially inward farther than said body or any other protrusion from said body, wherein the sealing lip seals against a sealing surface of the tube-like inner wall of the cartridge, the sealing lip extending parallel with or at least at an acute angle to the cylindrical longitudinal axis, wherein a gap is formed between said body and said tube-like inner wall such that the sealing lip is unobstructed and directly accessible through said gap from an end face side of the piston to be raised from the sealing surface by a tool engageable from said end face side of the piston through said gap while closing the cartridge with the piston so that air from the cartridge can escape passing the raised sealing lip and the gap; and
a cover plate arranged at the end face of the base member facing a cartridge interior, the cover plate is formed from a material different from that of the base member, wherein the cover plate comprises a sealing element resting against the tube-like inner wall of the cartridge.

2. The piston in accordance with claim 1, wherein the sealing lip is arranged such that, on being lifted up from the sealing surface, the sealing lip executes at least in part a movement transverse to the cylindrical longitudinal axis.

3. The piston in accordance with claim 1, wherein the sealing lip is arranged at an acute angle to the cylindrical longitudinal axis and the acute angle is reduced when the sealing lip is raised.

4. The piston in accordance with claim 1, wherein the sealing lip is formed such that the tool can directly act on the sealing lip.

5. The piston in accordance with claim 1, wherein the sealing lip is arranged circumferentially contacting the tube-like inner wall.

6. The piston in accordance with claim 1, wherein the cover plate is provided at the end face facing a cartridge interior, and the sealing element is arranged adjacent to the sealing lip to protect the sealing lip against contents of the cartridge.

7. The piston in accordance with claim 1, wherein the cover plate is provided at the end face facing a cartridge interior, and has at least one air passage opening spaced apart from the sealing lip, and wherein between the sealing lip and the air passage opening is provided at least one air duct between the base member and the cover plate.

8. A co-axial cartridge having a tube-like outer wall and a tube-like inner wall defining an annular chamber, and a piston, wherein the piston comprises:

a cylindrical annular base member having a body and a sealing lip extending from said body radially inward farther than said body or any other protrusion from said body, wherein the cylindrical annular base member can be inserted into the annual chamber of the cartridge and is displaceable along a cylindrical longitudinal axis in the cartridge, wherein the at least one sealing lip protrudes from said body and seals against a sealing surface of the tube-like inner wall of the cartridge, the sealing lip extending parallel with or at least at an acute angle to the cylindrical longitudinal axis, wherein a gap is formed between said body and said tube-like inner wall such that the sealing lip is unobstructed and is directly accessible through said gap from an end face side of the piston to be raised from the sealing surface by a tool engageable from said end face side of the piston through said gap while closing the cartridge with the piston so that air from the cartridge can escape passing the raised sealing lip and the gap; and a cover plate arranged at the end face of the base member facing a cartridge interior, the cover plate is formed from a material different from that of the base member, wherein the cover plate comprises a sealing element resting against the tube-like inner wall of the cartridge.

9. A cartridge with a cylindrical chamber for liquid, powder or paste compounds and at least one cylindrical piston comprising a piston base member having a body and at least one sealing lip, wherein the piston can be displaced along a cylindrical longitudinal axis and serves to close the cartridge, wherein a first ventilation device is arranged at an outer side of the cylindrical piston and a second ventilation device is arranged at an inner side of the cylindrical piston; wherein the first ventilation device is formed by said sealing lip of said piston base member facing away from a cartridge inner side and a tubular support of a cover plate, wherein the sealing lip extends radially inward farther than any other part of said base member so as to be unobstructed and directly accessible from the cartridge outer side such that the sealing lip is to be raised from the tubular support by a tool engageable from said cartridge outer side while closing the cartridge with the piston so that air from the cartridge can escape passing the raised sealing lip; and the second ventilation device is formed by at least one air passage opening formed in a cover plate of the piston pointing towards the cartridge inner side.

10. The cartridge in accordance with claim 9, wherein the ventilation devices form a ventilation arrangement which encompasses an air duct between the ventilation devices.

11. A system comprising a co-axial cartridge having a tube-like outer wall and a tube-like inner wall defining an annular chamber therebetween, and a piston, and a tool, wherein the piston comprises:

a cylindrical annular base member which can be inserted into the annular chamber of the cartridge and displaceable along a cylindrical longitudinal axis in the cartridge, wherein the base member comprises a body and at least one sealing lip protruding from said body so as to extend radially inward farther than said body or any other protrusion from said body, wherein the sealing lip seals against a sealing surface of the tube-like inner wall of the cartridge, the sealing lip extending parallel with or at least at an acute angle to the cylindrical longitudinal axis, wherein a gap is formed between said body and said tube-like inner wall such that the sealing lip is unobstructed and directly accessible through said gap from an end face side of the piston to be raised from the sealing surface by the tool engageable from the end face side of the piston through said gap while closing the cartridge with the piston so that air from the cartridge can escape passing the raised sealing lip and the gap, with the tool being able to displace the piston in the cartridge, wherein the tool actuates the sealing lip directly.

* * * * *